Patented May 2, 1933

1,907,371

UNITED STATES PATENT OFFICE

HANS STENZL, OF BASEL, SWITZERLAND

SUBSTANCES ARRESTING BLOOD COAGULATION AND PROCESS FOR THE MANUFACTURE OF SAME

No Drawing. Application filed October 23, 1930, Serial No. 490,823, and in Germany November 4, 1929.

Nothing is known with certainty concerning the manner in which blood is coagulated. The substances known up to the present as being capable of arresting blood coagulation are either entirely undefined chemically or of such heterogeneous nature that no conclusions can possibly be drawn as to the mechanism of their action. It was therefore a surprising discovery that substances which strongly arrest coagulation are obtained when compounds of high molecular weight formed by the polymerization of aromatic starting-products are rendered water-soluble by the introduction of salt-forming groups such as $-CH_2COOH, -SO_3H, -CH_2CH_2N(C_2H_5)_2$ by known methods. The substances so prepared have an action similar to the commercial hirudin preparations and unlike the latter, they are completely stable and of low toxicity. The power of arresting blood coagulation is also retained for prolonged periods in the living organism.

Example 1

3 parts of polyanethol which has been freed from lower polymers by extraction with ether and has an average molecular weight of about 10,000, is kneaded with 15 to 20 parts of concentrated sulfuric acid until a homogeneous deep red solution is formed. After standing two hours more in the cold it is poured into water and the excess of sulfuric acid removed by addition of chalk. The neutral filtrate from the calcium sulfate is treated with sodium carbonate solution until it gives a weakly alkaline reaction and separated from precipitated calcium carbonate, the filtrate being evaporated. The sodium salt of the highly polymerized anetholdisulfonic acid so obtained is a light yellow powder easily soluble in water.

Example 2

To a solution of 4.6 parts of sodium in 100 parts of absolute alcohol in an atmosphere of hydrogen, 18 parts of polymerized coniferylalcohol and 26 parts of diethylaminoethylbromide hydromide are added. After boiling two hours under reflux it is poured into dilute hydrochloric acid and the solution purified by filtration and extraction with ether. On addition of soda the polymerized diethylaminoethylconiferylalcohol is precipitated as a reddish-grey amorphous powder which dissolves in dilute hydrochloric acid to a neutral solution.

Example 3

45 parts of polymerized coniferylalcohol obtained by alkaline hydrolysis of Siamese gum-benzoin are dissolved in 66 parts of 30% sodium hydroxide and 100 parts of water and treated with a solution of 50 parts of chloracetic acid in 80 parts of 30% sodium hydroxide for a few hours on the water bath allowing the solution to concentrate. The evaporated water is then replaced and ammonium chloride solution added until trinitrobenzene paper is no longer turned brown. Some unchanged coniferylalcohol is precipitated. It is filtered and the filtrate acidified with dilute hydrochloric acid. Coniferyl glycollic acid is precipitated as a light brown amorphous powder. The corresponding sodium salt is readily soluble in water.

I claim:

1. Substances for arresting blood coagulation which are obtained by the introduction of a salt forming group selected from the group which consists of $-CH_2-COOH, -SO_3H$ and
$-CH_2-CH_2-N(C_2H_5)_2$ into compounds obtained by the polymerization of a substance selected from the group which consists of unsaturated phenols and their ethers, said polymerized compounds having been freed from the ether soluble polymers so that they comprise polymers above the di-polymer, the new products obtained by the introduction of said salt-forming groups being water-soluble and possessing an action similar to that of the commercial hirudin preparations.

2. Substances for arresting blood coagulation which are obtained by the introduction of the sulfonic acid group into compounds obtained by polymerization of a substance selected from the group which consists of unsaturated phenols and their ethers, said polymerized compounds having been freed from the ether-soluble polymers so that they comprise polymers above the di-polymer, the new products obtained by the introduction of said groups being water-soluble and possessing an action similar to that of commercial hirudin preparations.

3. The polyanethol disulfonic acid which is produced by treating polyanethol above the dianethol, which has been freed from its ether-soluble polymers, with concentrated sulfuric acid, the new product being easily soluble in water and having an action similar to that of the commercial hirudin preparations.

4. The process for the manufacture of substances for arresting blood coagulation which consists in introducing a salt-forming group selected from the group which consists of

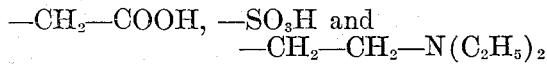

into polymers above the di-polymer which have been obtained by polymerization of a substance selected from the group which consists of unsaturated phenols and their ethers, which polymers have been freed from the ether-soluble polymers.

5. The process for the manufacture of substances for arresting blood coagulation which consists in introducing the sulfonic acid group into polymers above the dipolymer which have been obtained by polymerization of a substance selected from the group which consists of unsaturated phenols and their ethers, which polymers have been freed from the ether-soluble polymers.

6. The process for the manufacture of substances for arresting blood coagulation which consists in treating polyanethol above the dianethol, which has been freed from the ether-soluble polymers, with concentrated sulfuric acid.

In witness whereof I have hereunto set my hand.

HANS STENZL.